US008659331B2

(12) United States Patent
Hoyle

(10) Patent No.: US 8,659,331 B2
(45) Date of Patent: Feb. 25, 2014

(54) HIGH ACCURACY SIN-COS WAVE AND FREQUENCY GENERATORS, AND RELATED SYSTEMS AND METHODS

(75) Inventor: David J. Hoyle, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/487,804

(22) Filed: Jun. 4, 2012

(65) Prior Publication Data

US 2013/0181753 A1   Jul. 18, 2013

Related U.S. Application Data

(60) Provisional application No. 61/587,689, filed on Jan. 18, 2012.

(51) Int. Cl.
*H03B 28/00* (2006.01)
(52) U.S. Cl.
USPC ............................ 327/129; 327/106; 708/276
(58) Field of Classification Search
USPC .................................. 327/106, 129; 708/276
See application file for complete search history.

(56) References Cited

U.S. PATENT DOCUMENTS

| 4,482,974 A * | 11/1984 | Kovalick ............................ 708/8 |
| 4,652,832 A | 3/1987 | Jasper |
| 4,878,187 A | 10/1989 | Buneman |
| 4,905,177 A * | 2/1990 | Weaver et al. ................. 708/276 |
| 4,992,743 A * | 2/1991 | Sheffer ........................... 327/106 |
| 5,117,231 A * | 5/1992 | Yaron ............................. 342/195 |
| 5,126,960 A * | 6/1992 | Thong ............................. 708/276 |
| 5,467,294 A | 11/1995 | Hu et al. |
| 5,521,534 A * | 5/1996 | Elliott ............................. 327/129 |
| 5,737,253 A * | 4/1998 | Madisetti et al. .............. 708/276 |
| 5,963,607 A * | 10/1999 | Romano et al. ................ 375/373 |
| 5,999,581 A | 12/1999 | Bellaouar et al. |
| 6,330,578 B1 * | 12/2001 | Savin et al. .................... 708/270 |
| 6,333,649 B1 * | 12/2001 | Dick et al. ...................... 327/105 |
| 6,657,573 B2 | 12/2003 | Langlois et al. |
| 6,781,473 B1 * | 8/2004 | Chiu et al. ................. 331/177 R |
| 6,785,345 B2 * | 8/2004 | Blazo ............................. 375/326 |

(Continued)

OTHER PUBLICATIONS

Buneman, et al., "Stable On-line Creation of Sines or Cosines of Successive Angles," Proceedings of the IEEE, vol. 75, Issue: 10, 1987, 2 pages.

(Continued)

*Primary Examiner* — William Hernandez
(74) *Attorney, Agent, or Firm* — Peter Michael Kamarchik; Nicholas J. Pauley; Joseph Agusta

(57) ABSTRACT

High accuracy sin-cos wave and frequency generators, and related systems and methods. In non-limiting embodiments disclosed herein, the sin-cos wave generators can provide highly accurate sin-cos values for sin-cos wave generation with low hardware costs and small lookup table requirements. The embodiments disclosed herein may include a circuit to conduct an arithmetic approximation of a sin-cos curve based on a phase input. The circuit may be in communication with a point lookup table and a correction lookup table. The tables may receive the phase input and match the phase input to main sin-cos endpoints associated with the phase, and to a correction value for the phase. These values which are selected based on the phase input, may be communicated to a converter circuit where the arithmetic functions are applied to the values resulting in a sin-cos curve value.

27 Claims, 7 Drawing Sheets

(56) References Cited

U.S. PATENT DOCUMENTS

| | | | |
|---|---|---|---|
| 7,440,987 B1 | 10/2008 | Song et al. | |
| 7,576,616 B2 * | 8/2009 | Iwasaki | 331/45 |
| 7,701,260 B1 * | 4/2010 | Old | 327/106 |
| 7,890,562 B2 * | 2/2011 | Gross et al. | 708/276 |
| 7,984,091 B1 * | 7/2011 | Szedo | 708/276 |
| 2008/0005213 A1 * | 1/2008 | Holtzman | 708/276 |
| 2009/0157783 A1 * | 6/2009 | Seo et al. | 708/276 |
| 2010/0194444 A1 * | 8/2010 | Patterson | 327/106 |

OTHER PUBLICATIONS

Morrison, "Cosine, Products, Fourier Transforms, and Random Sums," Amer. Math. Monthly, 102:716-724, 1995, 10 pages.

Presti, et al., "A Direct Digital Frequency Synthesizer Using an IIR filter Implemented with a DSP Microprocessor," 1994 IEEE Conference on Acoustics, Speech, and Signal Processing, ICASSP-94, 4 pages.

International Search Report and Written Opinion—PCT/US2013/021844—ISA/EPO—Apr. 22, 2013.

* cited by examiner

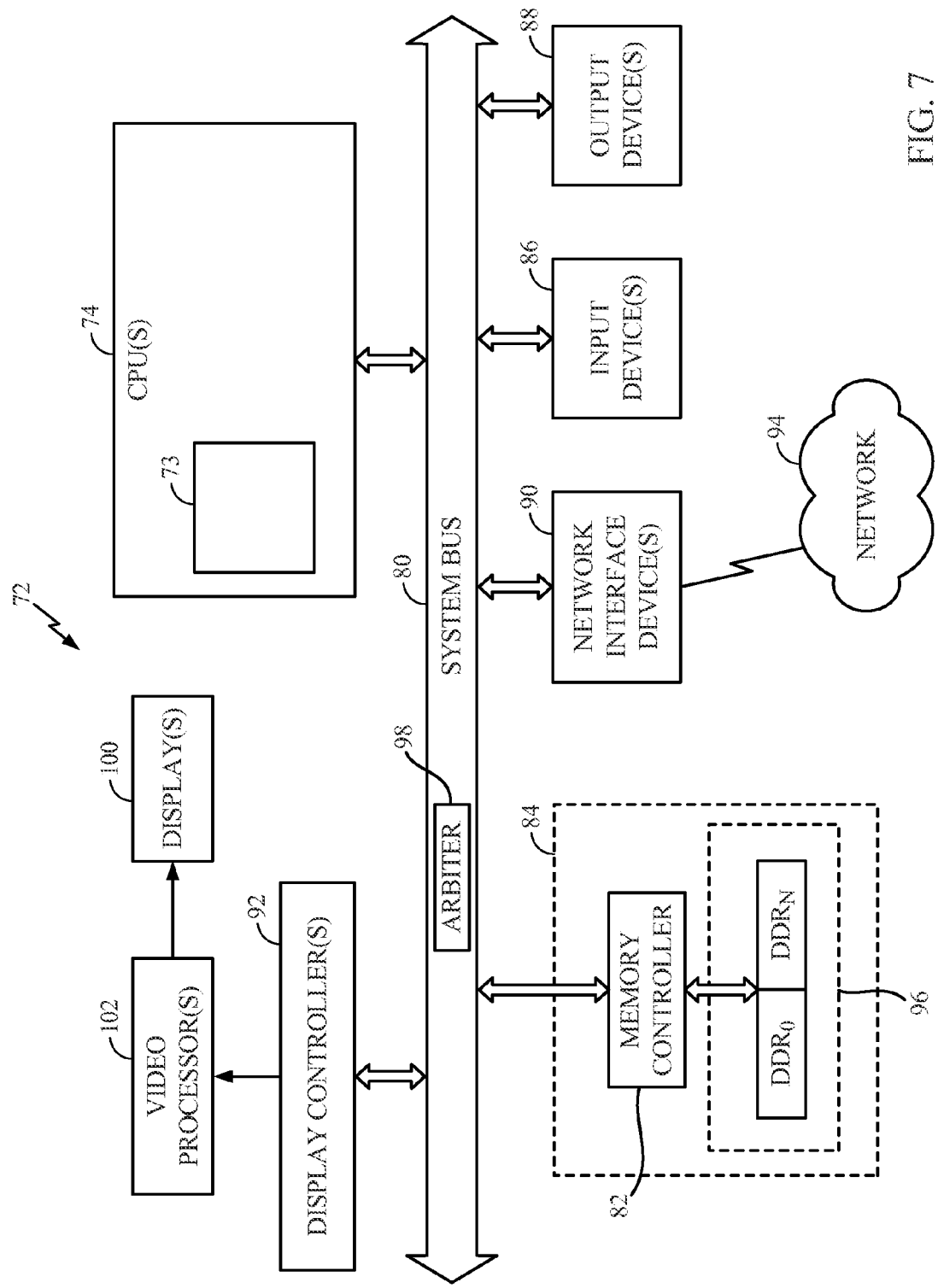

HIGH ACCURACY SIN-COS WAVE AND FREQUENCY GENERATORS, AND RELATED SYSTEMS AND METHODS

PRIORITY APPLICATION

The present application claims priority to U.S. Provisional Patent Application Ser. No. 61/587,689 entitled "HIGH ACCURACY SIN-COS WAVE AND FREQUENCY GENERATORS, AND RELATED SYSTEMS AND METHODS" filed on Jan. 18, 2012, which is hereby incorporated herein by reference in its entirety.

BACKGROUND

I. Field of the Disclosure

The technology of the disclosure relates to frequency generators that gauge frequency signals based on sine and cosine values.

II. Background

It is common in numerous industries to use various methods to approximate sine (sin) and/or cosine (cos) (sin-cos) wave signals from an existing or generated input signal. Such signal approximation is used for data and voice communications, including audio and visual communications in the telecommunications and entertainment industries. Other uses may include providing signals for testing equipment for development and manufacturing of electronic components, or for troubleshooting defective electronic components. One example of the use of signal approximation is implemented in a modem having a tone generator. The tone generated can be used for fast Fourier transform twiddle factor generation, frequency shift correction, and Doppler shift correction.

Various implementations of sin-cos wave signal approximation have been previously implemented to varying degrees of precision and efficiency. A common method is to provide a very large lookup table of pre-calculated (sin-cos) values, where the accuracy of the approximation is dependent upon the size of the table (i.e. the number of pre-calculated values.) Traditionally the size of the lookup table is approximately $2^{level\ of\ accuracy}$, resulting in exponentially larger tables for small increases in accuracy. In some instances, large lookup tables have been paired with linear interpolations to reduce their size. Tables of coefficients combined with polynomial curve fits have also been used to approximate curves. However, hardware cost is increased, because more tables are needed and polynomial equations increase the complexity of the calculations. Infinite Impulse Response (IIR) filters can produce sin waves, but the stability of the recursive calculation has a high rate of precision decay, even if only required for a short number of cycles.

With any of the existing methods of approximating a sin-cos wave, there is a tradeoff between accuracy, cost, and efficiency. To achieve greater accuracy, more data can be stored and/or more complex calculations can be executed. This can result in higher hardware costs based on the amount and complexity of the required hardware, and increased demands for processing time and power. Therefore, it is desirable to develop a frequency generator that can approximate sin-cos wave signals while achieving a high level of accuracy without incurring the typical increases in cost and reductions in efficiency.

SUMMARY OF THE DISCLOSURE

Embodiments disclosed in the detailed description include high accuracy sine and/or cosine (sin-cos) wave and frequency generators, and related systems and methods. In non-limiting embodiments disclosed herein, the sin-cos wave generators can provide highly accurate sin-cos values for sin-cos wave generation with low hardware cost and small lookup table requirements. The embodiments disclosed herein may include a circuit to conduct an arithmetic approximation of a sin-cos curve based on a phase input. The circuit may be in communication with a point lookup table and a correction lookup table. The tables may receive the phase input and match the phase input to main sin-cos endpoints associated with the phase and to a correction value for the phase. These values which are selected based on the phase input, may be communicated to a converter circuit where the arithmetic functions are applied to the values resulting in a sin-cos curve value.

In this regard in one embodiment, a frequency generator is provided. The frequency generator includes a phase accumulator configured to generate a phase signal representing a phase angle. A sin-cos converter in communication with the phase accumulator receives the phase signal as a phase input. The sin-cos converter generates a sin-cos curve value as a converter output. The sin-cos curve value is approximately equal to a sin-cos value at the phase angle within a predefined tolerance. The sin-cos converter further includes a point lookup table having main sin-cos endpoints at predefined intervals in a first angle range. Each of the main sin-cos endpoints comprise the sin-cos curve value at a given angle among the intervals. The sin-cos converter also includes a correction lookup table having a plurality of correction values representing a difference between sub-main sin-cos endpoints at intervals in a second angle range between two associated main sin-cos endpoints in the point lookup table, and approximations of the sin-cos curve values at given angles among the intervals. A point selection circuit of the sin-cos converter provides a first main sin-cos endpoint associated with a first side of the phase angle, and a second main sin-cos endpoint associated with a second side of the phase angle from the point lookup table. A correction selection circuit of the sin-cos converter provides a first correction value correlated with the first main sin-cos endpoint and a second correction value correlated with the second main sin-cos endpoint from the correction lookup table. A converter circuit of the sin-cos converter provides the sin-cos curve value at the phase angle in a converter output signal based on the first and second main sin-cos endpoints and the first and second correction values. In this manner, the correction values can be calculated from main sin-cos endpoints which can be repeatedly applied for phase angles having the same correction values without having to store large numbers of sin-cos values for an entire unit circle.

In another embodiment, a frequency generator is provided. The frequency generator comprises a means for generating a phase signal representing a phase angle. The frequency generator also comprises a means for receiving the phase signal as a phase input. The frequency generator also comprises a means for generating a sin-cos curve value as an output, the sin-cos curve value approximately equal to a sin-cos value at the phase angle within a predefined tolerance. The frequency generator also comprises a means for storing a point lookup table comprised of main sin-cos endpoints at predefined intervals in a first angle range, each of the main sin-cos endpoints comprising the sin-cos curve value at a given angle among the predefined intervals. The frequency generator also comprises a means for storing a correction lookup table comprised of a plurality of correction values representing a difference between first sub-main sin-cos endpoints at the predefined intervals in a second angle range between two associated main sin-cos endpoints in the point lookup table and approximations of the sin-cos curve values at given angles among the predefined intervals. The frequency generator also comprises a means for selecting from the point lookup table a first main sin-cos endpoint associated with a first side of the phase angle and a second main sin-cos endpoint associated with a second side of the phase angle. The frequency generator also comprises a means for selecting from the correction lookup table a first correction value correlated with the first main sin-cos endpoint and a second correction value correlated with the second main sin-cos endpoint. The frequency generator also comprises a means for generating the sin-cos curve value at the phase angle in the means for generating the sin-cos curve value output signal based on the first and second main sin-cos endpoints and the first and second correction values.

In another embodiment, a method of generating a frequency signal is provided. The method includes generating a phase signal representing a phase angle through a phase accumulator and receiving the phase signal as a phase input at a sin-cos converter circuit. The method also includes receiving at a converter circuit, from a point lookup table, which comprises main sin-cos endpoints at predefined intervals in a first angle range, each of the main sin-cos endpoints comprising a sin-cos curve value at a given angle among the intervals, a first main sin-cos endpoint associated with a first side of the phase angle and a second main sin-cos endpoint associated with a second side of the phase angle. The method also includes receiving at the sin-cos converter circuit from a correction lookup table, which comprises correction values representing a difference between the first sub-main sin-cos endpoints at intervals in a second angle range between two associated main sin-cos endpoints in the point lookup table and approximations of the sin-cos curve values at given angles among the intervals, a first correction value correlated with the first main sin-cos endpoint and a second correction value correlated with the second main sin-cos endpoint. The method further includes generating the sin-cos curve value as a converter output. The sin-cos curve value is approximately equal to a sin-cos value at the phase angle within a predefined tolerance based on the first and second main sin-cos endpoints and the first and second correction values.

In another embodiment, a computer-readable medium is provided. The computer-readable medium has stored thereon computer-executable instructions to cause a frequency generator to generate a phase signal representing a phase angle, and receive the phase signal as a phase input. The computer-executable instructions further cause the frequency generator to receive from a point lookup table, which comprises main sin-cos endpoints at predefined intervals in a first angle range, each of the main sin-cos endpoints comprising a sin-cos curve value at a given angle among the intervals, a first main sin-cos endpoint associated with a first side of the phase angle and a second main sin-cos endpoint associated with a second side of the phase angle. The computer-executable instructions further cause the frequency generator to receive from a correction lookup table, which comprises correction values representing a difference between the first sub-main sin-cos endpoints at intervals in a second angle range between two associated main sin-cos endpoints in the point lookup table and approximations of the sin-cos curve values at given angles among the intervals, a first correction value correlated with the first main sin-cos endpoint and a second correction value correlated with the second main sin-cos endpoint. The computer-executable instructions further cause the frequency generator to generate the sin-cos curve value as a converter output, the sin-cos curve value approximately equal to a sin-cos value at the phase angle within a predefined tolerance based on the first and second main sin-cos endpoints and the first and second correction values.

BRIEF DESCRIPTION OF THE FIGURES

FIG. 7 is a block diagram of an exemplary processor-based system that can include the exemplary sin-cos converters disclosed herein for high accuracy sin-cos wave generation.

DETAILED DESCRIPTION

Figure 1:
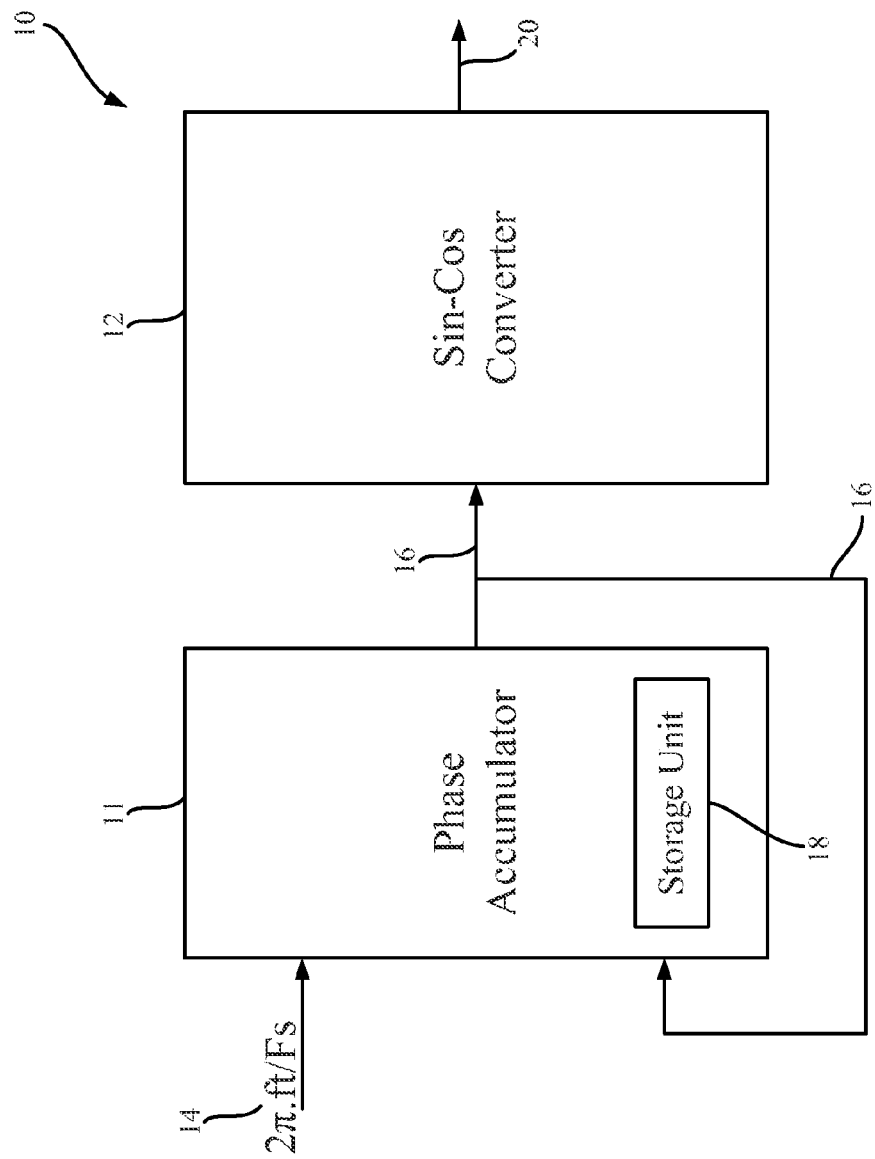
FIG. 1 is a block diagram of a phase accumulator in communication with an exemplary sine-cosine (sin-cos) converter for high accuracy sin-cos wave generation.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include high accuracy sine and/or cosine (sin-cos) wave and frequency generators, and related systems and methods. In non-limiting embodiments disclosed herein, the sin-cos wave generators can provide highly accurate sin-cos values for sin-cos wave generation with low hardware cost and small lookup table requirements. The embodiments disclosed herein may include a circuit to conduct an arithmetic approximation of a sin-cos curve based on a phase input. The circuit may be in communication with a point lookup table and a correction lookup table. The tables may receive the phase input and match the phase input to main sin-cos endpoints associated with the phase, and to a correction value for the phase. These values which are selected based on the phase input, may be communicated to a converter circuit where the arithmetic functions are applied to the values resulting in a sin-cos curve value.

In this regard in one embodiment, a frequency generator is provided. The frequency generator includes a phase accumulator configured to generate a phase signal representing a phase angle. A sin-cos converter in communication with the phase accumulator receives the phase signal as a phase input. The sin-cos converter generates a sin-cos curve value as a converter output. The sin-cos curve value is approximately equal to a sin-cos value at the phase angle within a predefined tolerance. The sin-cos converter further includes a point lookup table having main sin-cos endpoints at predefined intervals in a first angle range. Each of the main sin-cos endpoints comprise the sin-cos curve value at a given angle among the intervals. The sin-cos converter also includes a correction lookup table having a plurality of correction values representing a difference between sub-main sin-cos endpoints at intervals in a second angle range between two associated main sin-cos endpoints in the point lookup table, and approximations of the sin-cos curve values at given angles among the intervals. A point selection circuit of the sin-cos converter provides a first main sin-cos endpoint associated with a first side of the phase angle, and a second main sin-cos endpoint associated with a second side of the phase angle from the point lookup table. A correction selection circuit of the sin-cos converter provides a first correction value correlated with the first main sin-cos endpoint and a second correction value correlated with the second main sin-cos endpoint from the correction lookup table. A converter circuit of the sin-cos converter provides the sin-cos curve value at the phase angle based on the first and second main sin-cos endpoints and the first and second correction values. In this manner, the correction values can be calculated from main sin-cos endpoints which can be repeatedly applied for phase angles having the same correction values without having to store large numbers of sin-cos values for an entire unit circle.

In this regard, FIG. 1 is a block diagram of an exemplary frequency generator 10. The frequency generator includes a phase accumulator 11 in communication with an exemplary high accuracy sin-cos generator 12 having low hardware cost and small lookup table requirements, as discussed in more detail below. The phase accumulator 11 is configured to receive an input signal 14 to generate a sin-cos value. The phase accumulator 11 is configured to receive the input signal 14 and generate a phase signal 16 representing the phase angle of the input signal 14. The phase accumulator 11 may include of an adder for summing together the input signal 14 and a previous output (phase signal) 16 of the phase accumulator 11. The phase accumulator 11 includes a storage unit 18, such as a register, for storing the phase value represented by the phase signal 16 generated by the phase accumulator 11. At periodic intervals, the phase accumulator 11 produces the phase signal 16 that includes of the previous phase signal 16 obtained from the storage unit 18 summed with the input signal 14. The resulting phase signal 16 is a discrete waveform and provides discrete instances of the phase signal representing a phase angle. The implementation of the phase accumulator 11 may vary. For instance, the previous example of the components of the phase accumulator 11 may be embodied by various hardware or software configurations.

With continuing reference to FIG. 1, the phase signal 16 representing the phase angle of the input signal 14 is input into to the sin-cos converter 12. The sin-cos converter 12 generates a sin-cos curve value as a converter output signal 20. The sin-cos curve value represented by the converter output signal 20 may be approximately equal to a sin-cos value at the phase angle represented by the phase signal 16 within a predefined tolerance. The remainder of the disclosure provides exemplary embodiments and examples of a low cost sin-cos converter 12 that is capable of generating highly accurate sin-cos curve values based on a phase input 22 (see FIGS. 2, 5, and 6) derived from the phase signal 16.

Figure 2:
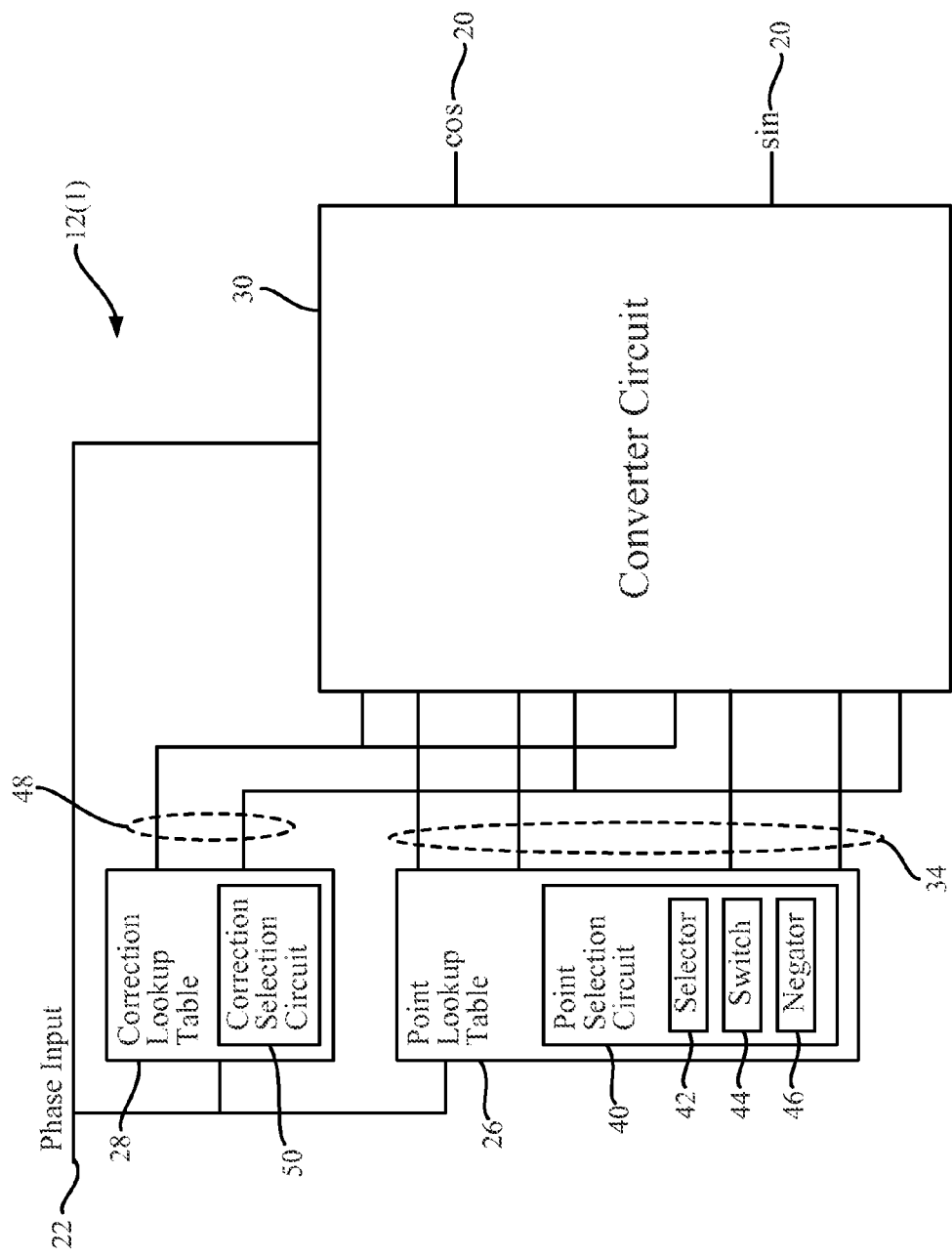
FIG. 2 is a block diagram of an exemplary sir-cos converter for high accuracy sin-cos wave generation employing a point lookup table for the main sin-cos endpoints and a correction lookup table for determining sin-cos values between the main sin-cos endpoints.

In this regard, FIG. 2 is a block diagram of an exemplary sin-cos converter 12(1) that may be employed in the frequency generator 10 of FIG. 1. The sin-cos converter 12(1) in this embodiment has low hardware costs due to the small size lookup tables used to convert the phase input 22 to a sin-cos value, consisting of the sin value and cos value for the sin-cos curve at a phase angle of the phase input 22, in the converter output signal 20. In this embodiment, the sin-cos converter 12(1) includes a point lookup table 26, a correction lookup table 28, and a converter circuit 30. The point lookup table 26 contains at least one data set corresponding to various points on a unit circle 32 (see FIG. 3), and the correction lookup table 28 contains at least one data set of correction values 48 corresponding to various angles between two points on the unit circle 32. The data sets of the point lookup table 26 and the correction lookup table 28 may be implemented by various data structures or stored on various forms of memory.

Figure 3:
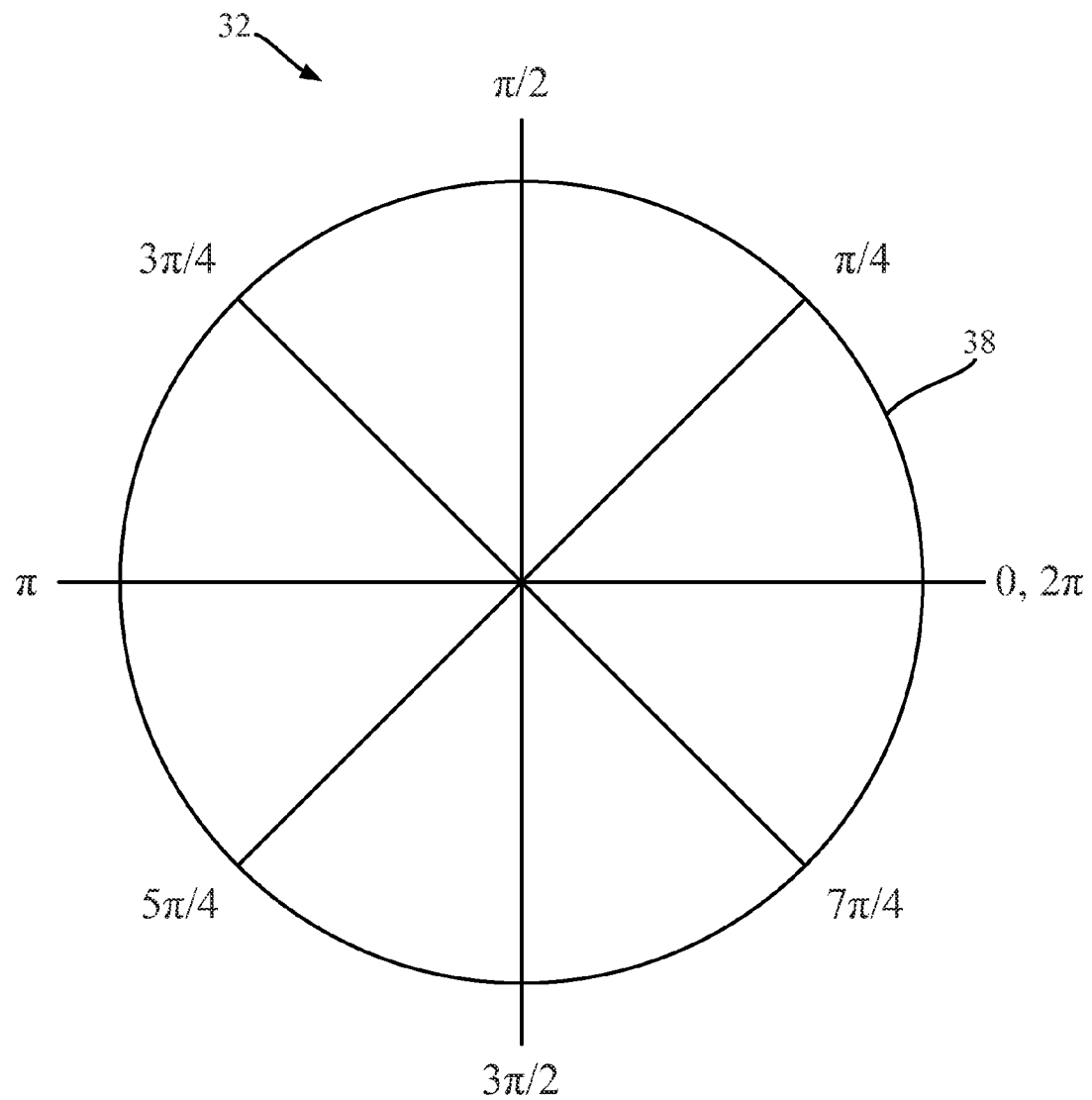
FIG. 3 is a diagram of an exemplary $2\pi$ radians unit circle divided into 8 segments of $\pi/4$ radians.
Figure 4:
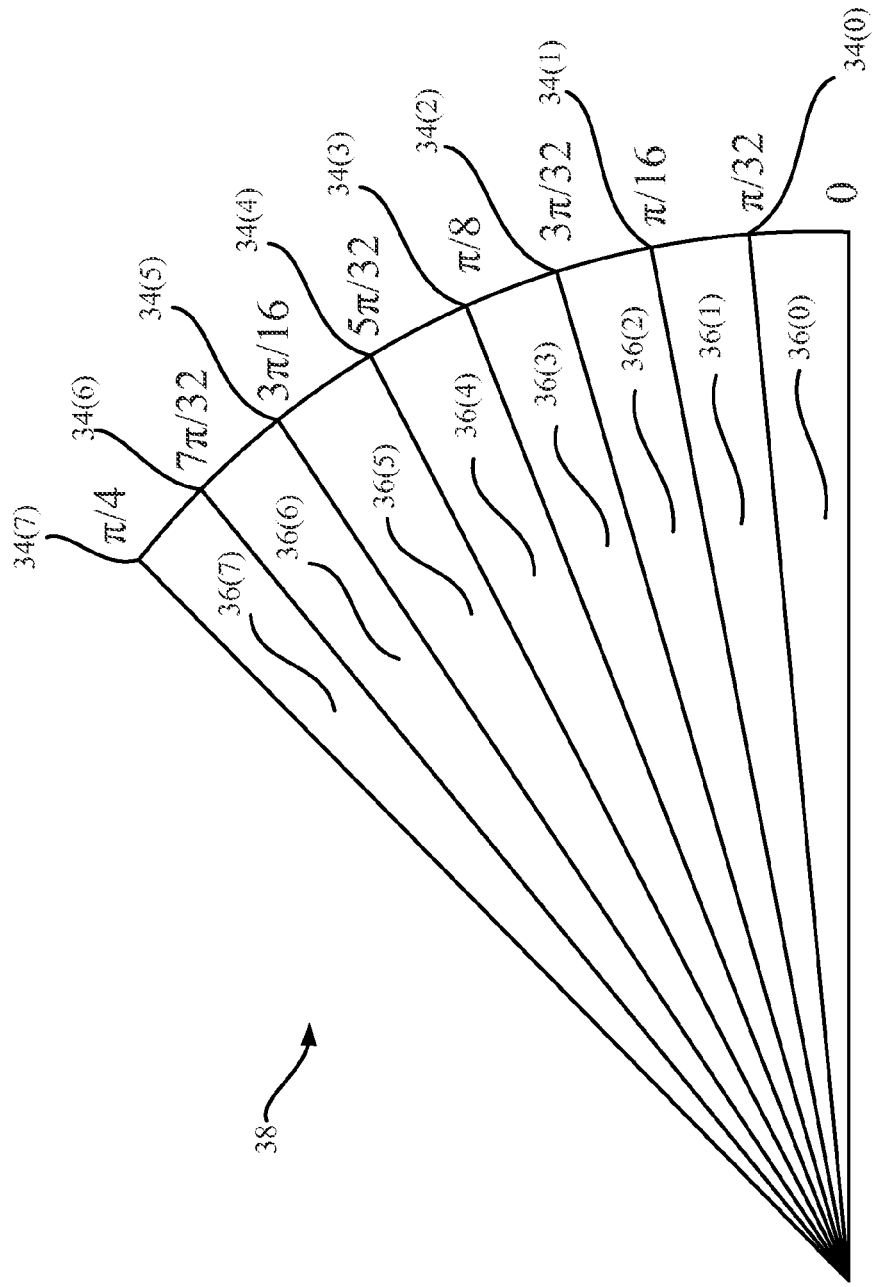
FIG. 4 is a diagram of an exemplary $\pi/4$ radians sector of the $2\pi$ radians unit circle of FIG. 3, subdivided by $\pi/32$ radian segments, each having a main sin-cos endpoint.

The point lookup table 26 that includes of main sin-cos endpoints 34 (see FIG. 4) at predefined intervals 36 (see FIG. 4) in a first angle range 38 (see FIGS. 3 and 4). Each of the main sin-cos endpoints 34 comprises the sin-cos curve value at a given phase angle among the predefined intervals 36. Thus, a sine (sin) value and a cosine (cos) value for a given phase angle, are provided in the point lookup table 26. The main sin-cos endpoints 34 may be provided for a predetermined number of significant digits, depending on the level of accuracy desired for the sine wave generation. Similarly, the number and size of the predefined intervals 36 will determine the number of main sin-cos endpoints 34 in the point lookup table 26. The more values there are at smaller predefined intervals 36 may increase the accuracy of the sine wave generation.

The main sin-cos endpoints 34 can be pre-calculated and stored, or hardcoded, such that when generating a sin wave these main sin-cos endpoints 34 do not have to be calculated at the moment the main sin-cos endpoints 34 are needed. This approach may reduce the cost of hardware needed to generate the sin wave, because it eliminates the need for hardware to compute the main sin-cos endpoints 34. By the same token, the cost of processing power and time is also reduced, because instead of running demanding and time consuming calculations, only the main sin-cos endpoints 34 are accessed and read.

The point lookup table 26 can become prohibitively large if the first angle range 38 is large and/or the predefined intervals 36 are small, requiring large amounts of memory to store the main sin-cos endpoints 34. Herein lies a tradeoff between accuracy and efficiency. To reduce the values stored in the point lookup table 26 while maintaining a high level of accuracy, in one embodiment, one may take advantage of the trigonometric identities that exist for the main sin-cos endpoints 34 within the unit circle 32. In this regard, FIG. 3 is a diagram of the $2\pi$ radians unit circle 32 divided into 8 segments of $\pi/4$ radians (or 45 degrees).

In each of the $\pi/4$ radian segments, the main sin-cos endpoints 34 at given angles are repeated. However, the main sin-cos endpoints 34 can be negated or switched between the sin and cos values. If the discrepancies are accounted for, as discussed further herein, the point lookup table 26 may contain $1/8^{th}$ of the values necessary to represent all of the main sin-cos endpoints 34 for the given angles among the first angle range 38. The division of the unit circle 32 discussed in this example, is not meant to be exclusive, and other divisions of the unit circle 32 are capable of taking advantage of the trigonometric identities to reduce the size of the point lookup table 26 while maintaining a desired level of accuracy.

In this regard, and continuing with this example, FIG. 4 is a diagram of a $\pi/4$ radians segment (first angle range 38) of the $2\pi$ radians unit circle 32 of FIG. 3, subdivided by $\pi/32$ radian segments (predefined intervals 36(0)-36(7)), each having a main sin-cos endpoint 34(0)-34(7). The division of the $\pi/4$ radian segment into eight predefined intervals 36(0)-36(7) of $\pi/32$ radians results in sixteen (16) main sin-cos endpoints

34(0)-34(7) (eight (8) sin values and eight (8) cos values, or eight (8) sin-cos curve values) being stored in the point lookup table 26. Taking advantage of the trigonometric identities of the unit circle 32 and the fact that, in this example, the unit circle 32 has been divided into eight (8) segments, the sixteen (16) values of the point lookup table 26 can be used to represent 128 main sin-cos endpoints 34(0)-34(127) (sixty-four (64) sin values and sixty-four (64) cos values, or sixty-four (64) sin-cos curve values) at different angles on the unit circle 32.

In this regard, the point lookup table 26 in FIG. 2, may include a point selection circuit 40 for providing, from the point lookup table 26, the main sin-cos endpoints 34 associated with either side of the phase angle of the phase input 22. Components of the point selection circuit 40 may include a selector 42, a switch 44, and a negator 46. The selector 42 may be implemented to select the main sin-cos endpoints 34 correlating to a reference phase angle of the phase input 22 representative of an equivalent phase angle within the first angle range 38. Thus, even if the phase angle of the phase input 22 is outside of the first angle range 38, the correct associated main sin-cos endpoints 34 may be selected. The switch 44 and the negator 46 may be implemented to account for the main sin-cos endpoints 34 being negated or switched between the sin and cos values while taking advantage of their trigonometric identities. The switch 44 may be implemented to switch the main sin-cos endpoint 34 values correlating to the phase angle of the phase input 22 when necessary. The negator 46 may be implemented to negate one or both of the main sin-cos endpoint 34 values correlating to the phase angle of the phase input 22 when necessary. The determinations to switch or negate the main sin-cos endpoint 34 values are dependent upon the phase angle provided by the phase input 22, because the phase angle may place the final main sin-cos endpoints 34 in a different segment of the unit circle 32 than the one stored in the point lookup table 26.

Due to efficiency and accuracy concerns, the point lookup table 26 alone may be insufficient to produce sin-cos values of the desired accuracy. If the point lookup table 26 is large, then efficiency suffers, and if it is small, then accuracy suffers. In one embodiment, a correction lookup table 28 may be used in conjunction with the point lookup table 26 to achieve both accuracy and efficiency. The correction lookup table 28 may include a number correction of values 48 representing a difference between the sub-main sin-cos endpoints 34 at intervals in a second angle range between two adjacent main sin-cos endpoints 34 in the point lookup table 26 and approximations of the sin-cos curve values at given angles among the intervals in the second angle range. Like the point lookup table 26, the correction values 48 of the correction lookup table 28 may be given for a predetermined number of significant digits depending on the level of accuracy desired for the sine wave generation. Similarly, the number and size of the intervals in the second angle range will determine the number of correction values 48 in the correction lookup table 28, where the more values there are at smaller intervals may increase the accuracy of the sine wave generation.

Again, similar to the main sin-cos endpoints 34, the correction values 48 can be pre-calculated and stored, or hard-coded, such that when generating a sin wave these correction values 48 do not have to be calculated at the moment the correction values 48 are needed. This predetermination and storing of the correction values 48 may reduce the cost of hardware needed to generate the sin wave because it eliminates the need for the hardware to compute the correction values 48. The cost of processing power and time is also reduced, because instead of running demanding and time consuming calculations, all that is required is that the correction values 48 be accessed and read.

Still, there could be a problem with the correction values 48 if the correction lookup table 28 becomes too large. This may occur if the predefined intervals 36 in the second angle range are small, requiring large amounts of memory to store the correction values 48. However, a feature of the calculation of the correction values 48 allows for a single data set to be stored for both the sin and cos values of the main sin-cos endpoints 34, cutting back on memory requirements, as discussed further herein.

In one embodiment, one may use an approximation of the sin-cos curve values for a phase angle between two main sin-cos endpoints 34. However, calculating or storing an approximation for numerous phase angles within the various predefined intervals 36 for even the first angle range 38 can be costly. It is herein determined, that to reduce the costs of generating accurate sin waves (instead of using the approximation itself, the correction values 48 can be calculated from the approximations, and repeatedly applied for similar phase angles within multiple predefined intervals 36 within various repeated angle ranges.) Thereby, the correction values 48 only have to be calculated and stored for one predefined interval 36 of the first angle range 38.

An exemplary embodiment applies an approach availing of the Buneman identity, wherein, based on a trigonometric identity, if the two points ('d' and '−d') that are equidistant on either side of an unknown value ('a'), are known, then there is an exact solution to the value in between them:

$$e^{ja} = \frac{1}{2} \frac{e^{j(a+d)} + e^{j(a-d)}}{\cos d}$$

This identity can be used to determine sin-cos endpoint 34 values between two other known sin-cos endpoints 34. Thus, starting with a pair of main sin-cos endpoints 34, the following equation can be applied recursively between the pair of main sin-cos endpoints 34 to determine a sub-main sin-cos endpoint 34. Then, the equation may be applied between one of the two main sin-cos endpoints 34 in the pair and the sub-main sin-cos endpoint 34 to determine another sin-cos endpoint 34, and then even between two sub-main sin-cos endpoints 34 to determine yet another sub-main sin-cos endpoint 34, as shown below ('Δ' is the distance on each side of angle 'x').

$$\cos(x) = \frac{\cos(x - \Delta) + \cos(x + \Delta)}{2\cos(\Delta)}$$

From these recursive calculations, a number of sub-main sin-cos endpoints 34 can be calculated. A feature of this calculation is that substitution into the equation can derive equations for each of the sub-main sin-cos endpoints 34 as a function of $\cos(x_0)$ multiplied by a lower coefficient and $\cos(x_n)$, multiplied by an upper coefficient. When the immediately preceding equation is used to derive sub-main sin-cos endpoint 34 as a function of $\cos(x_0)$ and $\cos(x_n)$, a secant-based coefficient for $\cos(x_0)$ term (i.e., the upper coefficient) and a secant-based coefficient for $\cos(x_n)$ term (i.e., the lower coefficient) will be provided. This is shown in the equations immediately below, by example, for derived and flattened equations for $\cos(x_1)$ through $\cos(x_7)$ provided as a function $\cos(x_0)$ and $\cos(x_n)$, when n=8. These upper and lower coefficients can be applied to the sin-cos endpoints 34 (i.e., cos $(x+\Delta)$, $\cos(x-\Delta)$, $\sin(x+\Delta)$, $\sin(x-\Delta)$) to determine the sub-main sin-cos endpoints 34 as a function of $\cos(x_0)$ and $\cos(x_n)$.

$$\cos(x_1) = \left[\frac{1}{2\cos(\Delta)} + \frac{1}{4\cos(2\Delta)\cos(\Delta)} + \frac{1}{8\cos(\Delta)\cos(2\Delta)\cos(4\Delta)}\right]\cos(x_0) +$$
$$\frac{1}{8\cos(4\Delta)\cos(2\Delta)\cos(\Delta)}\cos(x_8)$$

$$\cos(x_2) = \left[\frac{1}{2\cos(2\Delta)} + \frac{1}{4\cos(2\Delta)\cos(4\Delta)}\right]\cos(x_0) +$$
$$\frac{1}{4\cos(4\Delta)\cos(2\Delta)}\cos(x_8)$$

$$\cos(x_3) = \left[\frac{1}{4\cos(\Delta)\cos(4\Delta)} + \frac{1}{4\cos(\Delta)\cos(2\Delta)} + \frac{1}{8\cos(\Delta)\cos(2\Delta)\cos(4\Delta)}\right].$$
$$\cos(x_0) + \left[\frac{1}{8\cos(4\Delta)\cos(2\Delta)\cos(\Delta)} + \frac{1}{4\cos(\Delta)\cos(\Delta)}\right]\cos(x_8)$$

$$\cos(x_4) = \frac{1}{2\cos(4\Delta)}\cos(x_0) + \frac{1}{2\cos(4\Delta)}\cos(x_8)$$

$$\cos(x_5) = \left[\frac{1}{4\cos(\Delta)\cos(4\Delta)} + \frac{1}{8\cos(\Delta)\cos(2\Delta)\cos(4\Delta)}\right]\cos(x_0) +$$
$$\left[\frac{1}{8\cos(\Delta)\cos(2\Delta)\cos(4\Delta)} + \frac{1}{4\cos(\Delta)\cos(2\Delta)} + \frac{1}{4\cos(\Delta)\cos(4\Delta)}\right]\cos(x_8)$$

$$\cos(x_6) = \frac{1}{4\cos(2\Delta)\cos(4\Delta)}\cos(x_0) +$$
$$\left[\frac{1}{4\cos(2\Delta)\cos(4\Delta)} + \frac{1}{2\cos(2\Delta)}\right]\cos(x_8)$$

$$\cos(x_7) = \frac{1}{8\cos(\Delta)\cos(2\Delta)\cos(4\Delta)}\cos(x_0) + \left[\frac{1}{8\cos(\Delta)\cos(2\Delta)\cos(4\Delta)} +\right.$$
$$\left.\frac{1}{4\cos(\Delta)\cos(2\Delta)} + \frac{1}{2\cos(2\Delta)}\right]\cos(x_8)$$

These coefficients can be pre-calculated and stored in memory for use. For example, in the following example of these coefficients shown in Table 1 below, it should be noted that the only the upper coefficients or the lower coefficients may need to be stored and used as correction values 48, because the upper coefficients are the same as the lower coefficients from opposing index values around a central index value, as shown in Table 1 below. Thus, the upper coefficients can be used to provide the lower coefficients, and vice versa.

TABLE 1

| \multicolumn{5}{c}{Correction Value Table} | | | | |
|---|---|---|---|---|
| Index | Upper Coeff | Lower Coef | Ramp | delta |
| 0 | 0.000000 | 1.000000 | 0.000000 | 0.00000000 |
| 1 | 0.062902 | 0.938232 ↑ | 0.062500 | 0.00040183 |
| 2 | 0.125794 | 0.876322 | 0.125000 | 0.00079419 |
| 3 | 0.188668 | 0.814280 | 0.187500 | 0.00116760 |
| 4 | 0.251513 | 0.752116 | 0.250000 | 0.00151260 |
| 5 | 0.314320 | 0.689838 | 0.312500 | 0.00181972 |
| 6 | 0.377080 | 0.627456 | 0.375000 | 0.00207951 |
| 7 | 0.439783 | 0.564980 | 0.437500 | 0.00228251 |
| 8 | 0.502419 | 0.502419 | 0.500000 | 0.00241929 |
| 9 | 0.564980 | 0.439783 | 0.562500 | 0.00248040 |
| 10 | 0.627456 | 0.377080 | 0.625000 | 0.00245642 |
| 11 | 0.689838 | 0.314320 | 0.687500 | 0.00233795 |
| 12 | 0.752116 | 0.251513 | 0.750000 | 0.00211560 |
| 13 | 0.814280 | 0.188668 | 0.812500 | 0.00177998 |
| 14 | 0.876322 | 0.125794 | 0.875000 | 0.00132173 |
| 15 | 0.938232 ↓ | 0.062902 | 0.937500 | 0.00073151 |
| 16 | 1.000000 | 0.000000 | 1.000000 | 0.00000000 |

The Ramp value in Table 1 above is a linear interpolation of the exact values calculated using the Buneman identity. For small intervals, the linear interpolation values are close to the upper coefficient values, but not close enough to achieve the desired accuracy. Thus, the correction value 48 (delta in Table 1) may be calculated as the difference between the upper coefficient and the Ramp value. Further, because the upper and lower coefficients mirror each other from opposing ends around a central value, only one set of correction values 48 is needed in the correction lookup table 28 since a selection of the corresponding correction value 48 for a lower coefficient can be chosen by inverting the order of selecting the correction value 48.

The correction lookup table 28 may include a correction selection circuit 50 for providing, from the correction lookup table 28, the correction value 48. The correction selection circuit 50 selects the correction value 48 correlated with the main sin-cos endpoint 34 on one side of the phase angle, and the correction value 48 correlated with the main sin-cos endpoint 34 on the other side of the phase angle. In one embodiment, this determination may be made based on the phase input 22. Alternatively, the determination may be made based on the main sin-cos endpoints 34 selected from the point lookup table 26.

The converter circuit 30, described further herein, receives the main sin-cos endpoints 34 from the point lookup table 26 and the correction values 48 from the correction lookup table 28. With the values from the tables and the phase input 22, the converter circuit 30 calculates a sin-cos curve value for the given phase angle.

Figure 5:
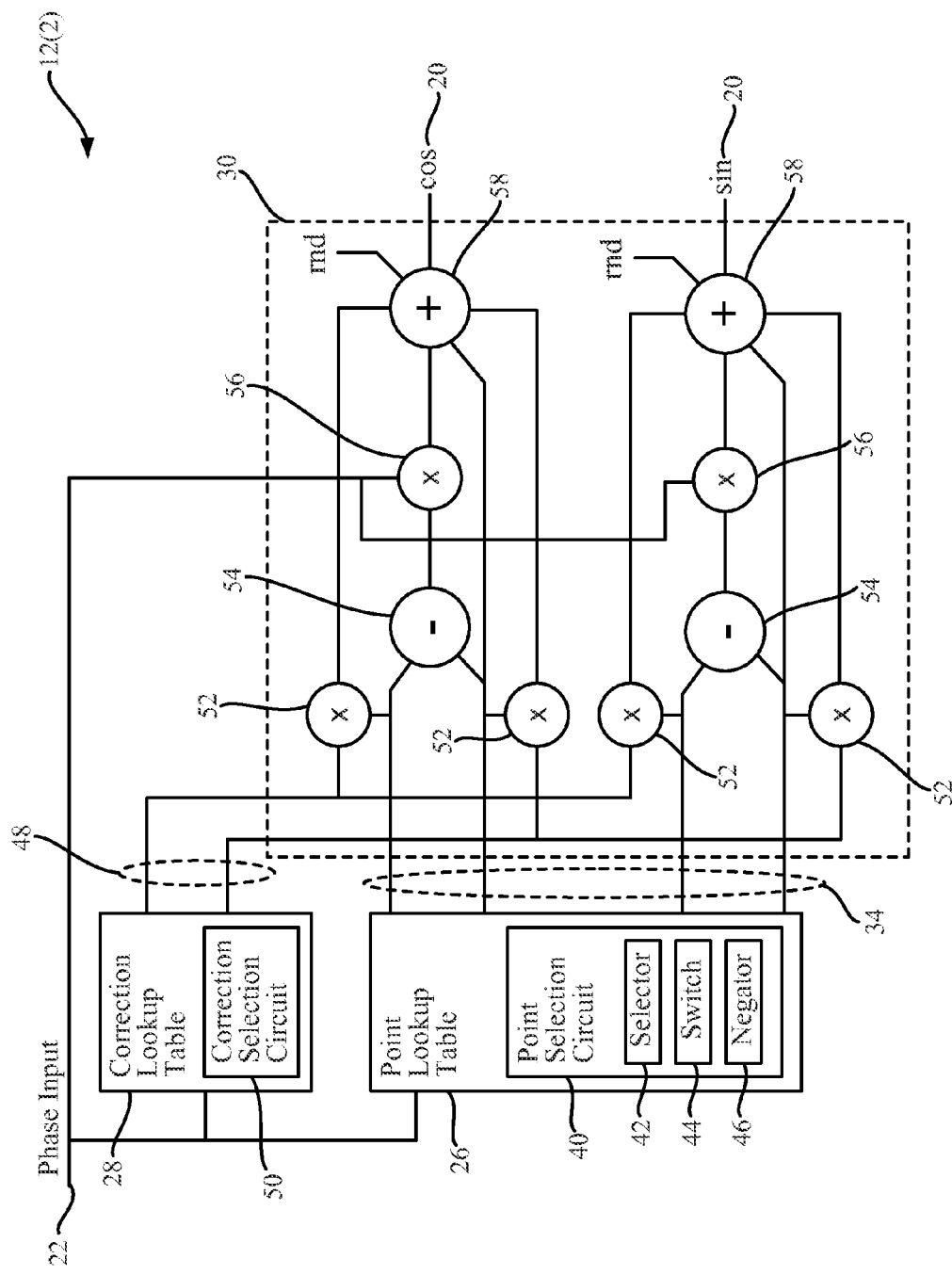
FIG. 5 is a block diagram of another exemplary sin-cos converter for high accuracy sine wave generation employing a reduced size sin-cos value lookup table to generator main sin-cos points with a separate correction lookup table to determine intermediate points.

FIG. 5 is a block diagram of an exemplary apparatus (sin-cos converter 12(2)) for high accuracy sine wave generation with low hardware costs and small lookup table requirements. In this figure, the converter circuit 30 is shown in greater detail. Components of the converter circuit 30 may include a primary multiplier 52, a subtractor 54, a secondary multiplier 56, and a primary adder 58. Once the main sin-cos endpoints 34 are selected from the point lookup table 26, and the corresponding correction values 48 are selected from the correction lookup table 28, the corresponding pair of the sin or cos values of the sin-cos endpoints 34 and the correction values 48 are multiplied by the primary multiplier 52. In one embodiment, two primary multipliers 52 are implemented, each primary multiplier 52 responsible for multiplying one of the corresponding pairs of the sin or cos values of the sin-cos endpoints 34 and the correction values 48. When calculating the sin value of the sin-cos curve value, one primary multiplier 52 multiplies the sin value on one side of the phase angle with the corresponding correction value 48, and the other primary multiplier 52 multiplies the sin value on the other side of the phase angle with the corresponding correction value 48. If there is only one primary multiplier 52, then this process takes place in series rather than in parallel, as when there are two primary multipliers 52.

The resultants from the primary multiplier 52 are subtracted from each other by the subtractor 54. The resulting difference is multiplied by the secondary multiplier 56 with the phase input 22. Then, the resultant from the primary multiplier 52, the resultant from the secondary multiplier 56, and one of the main sin-cos endpoint 34 values are added together by the primary adder 58. In an alternative embodiment, a rounding bit may also be added by the primary adder 58. The resulting sum of the primary adder 58 is either the sin or cos curve value of the sin-cos curve value for the given phase angle depending on if the values multiplied in the primary multiplier 52 were sin values or cos values of the main sin-cos endpoint 34. After the first of the sin or cos curve values of the sin-cos curve value has at least begun being calculated, the other value of the sin-cos curve value can begin calculating.

Alternative to the calculation for the sin-cos curve values being calculated in series, there may be a second set of the primary multiplier 52, the subtractor 54, the secondary multiplier 56, and the primary adder 58. Such an alternative embodiment may allow for the calculation of the sin value and the cos value of the sin-cos curve value to be calculated in parallel.

In this example, the unit circle 32 is segmented into the first angle range 38 being from 0 to π/8 radians. In that angle range, the identities of the unit circle 32 give sixteen (16) main sin-cos endpoints 34 (eight (8) sin values and 8 cos values), which are pre-calculated and stored in the point lookup table 26. Within the predefined intervals 36 between the main sin-cos endpoints 34, which span a range of 0 to π/64 radians, thirty-two (32) correction values 48 are pre-calculated and stored in the correction lookup table 28. θ represents the phase angle; φ represents the angle equivalent to θ within the first angle range 38; δ represents a sub-angle used to select the closest correction values 48; sintable(φ), sintable(φ+π/64), costable(φ), costable(φ+π/64) are the functions for selecting the main sin-cos endpoints 34; and bctable(δ) and bctable(π/64-δ) are the functions for selection of the correction values 48, a mathematical representation of the calculation of the sin-cos curve value is as follows:

$$\sin(R) = \text{sintable}(\varphi) + \left(\text{sintable}\left(\varphi + \frac{W}{64}\right) - \text{sintable}(\varphi)\right) \cdot \delta \cdot \frac{64}{\pi} +$$
$$\text{sintable}(\varphi) \cdot \text{bctable}\left(\frac{W}{64} - \delta\right) + \text{sintable}\left(\varphi + \frac{W}{64}\right) \cdot \text{bctable}(\delta)$$
$$\cos(R) = \text{costable}(\varphi) + \left(\text{costable}\left(\varphi + \frac{W}{64}\right) - \text{costable}(\varphi)\right) \cdot \delta \cdot \frac{64}{\pi} +$$
$$\text{costable}(\varphi) \cdot \text{bctable}\left(\frac{W}{64} - \delta\right) + \text{costable}\left(\varphi + \frac{W}{64}\right) \cdot \text{bctable}(\delta)$$

Figure 6:
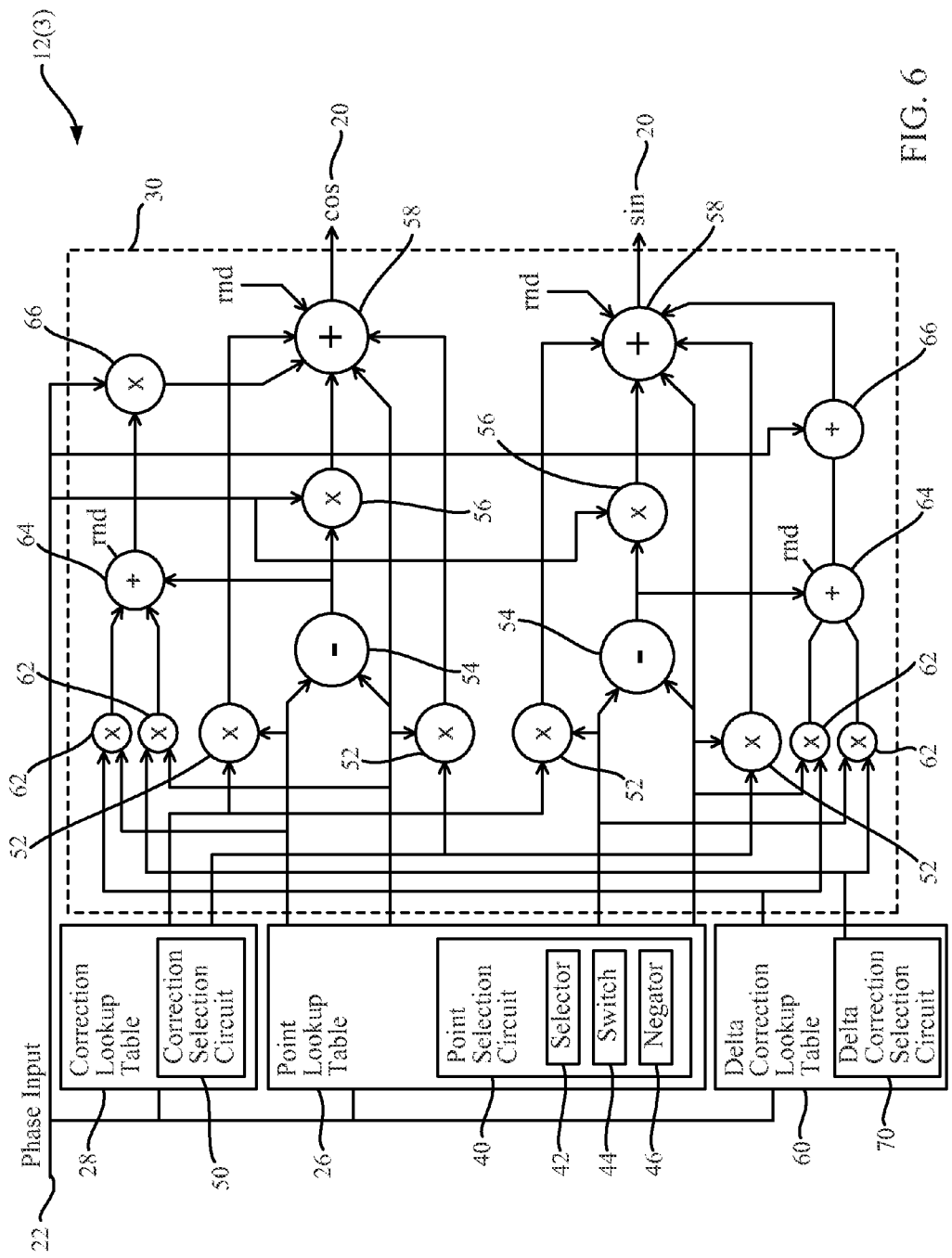
FIG. 6 is a block diagram of another exemplary sin-cos converter for high accuracy sine wave generation employing an additional delta correction lookup table comprised of a plurality of delta correction values representing a difference between two associated correction values of a correction value lookup table.

FIG. 6 is a block diagram of an exemplary apparatus (sin-cos converter 12(3)) for high accuracy sin wave generation with low hardware costs and small lookup table requirements. The embodiment in FIG. 6 may allow for even greater accuracy in the calculation of the sin-cos curve value, by introducing a linear interpolation between the sub-main sin-cos endpoints 34. The angle between the sub-main sin-cos endpoints 34 may be so small, that any deviation from the exact sin-cos curve value may be beyond the level of accuracy desired. To incorporate this linear interpolation between the sub-main sin-cos endpoints 34, the converter circuit 30 may also include a delta correction lookup table 60, a tertiary multiplier 62, a secondary adder 64, and a quaternary multiplier 66.

The delta correction lookup table 60 contains the difference between each of the associated correction values 48 from the correction lookup table 28. The delta correction values 68 are selected from the delta correction lookup table 60 by a delta correction selection circuit 70 in the same way the correction selection circuit 50 selects the correction values 48.

The tertiary multiplier 62 functions equivalently to the primary multiplier 52, except that instead of multiplying the main sin-cos endpoint 34 values with the correction values 48, the tertiary multiplier 62 multiplies the main sin-cos endpoint values 34 with the respective delta correction values 68. As with the primary multiplier 52, there can be more than one tertiary multiplier 62. The secondary adder 64 sums the resultants of the tertiary multiplier 62 and the resulting difference from the subtractor 54. The resulting sum from the secondary adder 64 is multiplied by the quaternary multiplier 66 with the phase input 22. In this embodiment, the primary adder 58 includes the resultant from the quaternary multiplier 66 in its summation.

As with the previous embodiments of calculating the sin-cos curve value, the sin curve value and the cos curve value may be calculated in series, or the structure recited herein could be duplicated to be able to calculate the values in parallel.

The high accuracy sin-cos wave and frequency generators according to the embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

In this regard, FIG. 7 illustrates an example of a processor-based system 72 that can employ a frequency generator 73, which may be like the frequency generator 10 in FIG. 1 for example. The frequency generator 73 in this example is a high accuracy sin wave generator with low hardware costs and small lookup table requirements, like provided, by example in FIGS. 1-4. In this example, the processor-based system 72 includes one or more central processing units (CPUs) 74. The frequency generator 73 is provided in the CPU 74 in this example, but may be provided elsewhere in the processor-based system 72. The CPU(s) 74 may be a master device. The CPU(s) 74 is coupled to a system bus 80 and can intercouple master devices and slave devices included in the processor-based system 72. The system bus 80 may be a bus interconnect. As is well known by ordinary skilled artisans, the CPU(s) 74 communicates with these other devices by exchanging address, control, and data information over the system bus 80. Serving as an example of a slave device, the CPU(s) 74 can communicate bus transaction requests to the memory controller 82. Although not illustrated in FIG. 7, multiple system buses 80 could be provided, wherein each system bus 80 constitutes a different fabric.

Other master and slave devices can be connected to the system bus 80. As illustrated in FIG. 7, these devices can include a memory system 84, one or more input devices 86, one or more output devices 88, one or more network interface devices 90, and one or more display controllers 92, as examples. The input device(s) 86 can include any type of input device, including but not limited to input keys, switches, voice processors, etc. The output device(s) 88 can include any type of output device, including but not limited to audio, video, other visual indicators, etc. The network interface device(s) 90 can be any devices configured to allow exchange of data to and from a network 94. The network 94 can be any type of network, including but not limited to a wired or wireless network, a private or public network, a local area network (LAN), a wide local area network (WLAN), and the Internet. The network interface device(s) 92 can be configured to support any type of communication protocol desired. The memory system 84 can include one or more memory units 96. The arbiter 98 may be provided between the system bus 80 and the master and slave devices coupled to the system bus 80, such as, for example, the memory units 96 provided in the memory system 84.

The CPU(s) 74 may also be configured to access the display controller(s) 92 over the system bus 80 to control information sent to one or more display(s) 100. The display controller(s) 92 sends information to the display(s) 100 to be displayed via one or more video processors 102, which process the information to be displayed into a format suitable for the display(s) 100. The display(s) 100 can include any type of display, including but not limited to a cathode ray tube (CRT), a liquid crystal display (LCD), a plasma display, etc.

The CPU(s) 74 and the display controller(s) 92 may act as master devices to make memory access requests to the arbiter 98 over the system bus 80. Different threads within the CPU(s) 74 and the display controller(s) 92 may make requests to the arbiter 98.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A frequency generator, comprising:
   a phase accumulator configured to generate a phase signal representing a phase angle; and
   a sin-cos converter configured to receive the phase signal as a phase input, and generate a sin-cos curve value as a converter output, the sin-cos curve value approximately equal to a sin-cos value at the phase angle within a predefined tolerance; and
   the sin-cos converter, comprising:
   a point lookup table comprised of main sin-cos endpoints at predefined intervals in a first angle range, each of the main sin-cos endpoints comprising the sin-cos curve value at a given angle among the predefined intervals;
   a correction lookup table comprised of a plurality of correction values representing a difference between first sub-main sin-cos endpoints at the predefined intervals in a second angle range between two associated main sin-cos endpoints in the point lookup table and approximations of the sin-cos curve values at given angles among the predefined intervals;
   a point selection circuit configured to provide from the point lookup table, a first main sin-cos endpoint associated with a first side of the phase angle and a second main sin-cos endpoint associated with a second side of the phase angle;
   a correction selection circuit configured to provide from the correction lookup table, a first correction value correlated with the first main sin-cos endpoint and a second correction value correlated with the second main sin-cos endpoint; and
   a converter circuit configured to provide the sin-cos curve value at the phase angle in a converter output signal based on the first and second main sin-cos endpoints and the first and second correction values.

2. The frequency generator of claim 1, wherein each of the plurality of correction values comprise at least one of a secant-based coefficient for a Buneman identity.

3. The frequency generator of claim 2, wherein the coefficients approximately mirror each other from opposing ends around a central value, allowing for use of a single data set to represent all of the coefficients.

4. The frequency generator of claim 1, wherein the approximations of the sin-cos curve values at the given angles among the predefined intervals comprise linear interpolations resulting in second sub-main sin-cos endpoints.

5. The frequency generator of claim 1, wherein the first angle range, in which the main sin-cos endpoints are at the predefined intervals, spans π/4 radians of a unit circle.

6. The frequency generator of claim 5, wherein the phase input further signifies a section of the unit circle correlating to the phase angle, and
wherein the point selection circuit further comprises:
a selector configured to select the main sin-cos endpoints correlating to a reference phase angle representative of an equivalent phase angle within the first angle range;
a switch configured to switch main sin-cos endpoint values correlating to the phase angle when necessary; and
a negator configured to negate the main sin-cos endpoint values correlating to the phase angle when necessary.

7. The frequency generator of claim 1, wherein:
the point selection circuit comprises a plurality of first point outputs;
the correction selection circuit comprises a plurality of correction outputs; and
the converter circuit further comprises:
a first primary multiplier, in communication with a respective one of the first point outputs and a respective one of the correction outputs, configured to multiply values provided by a point output and a correction output, and having a first primary multiplier output;
a first subtractor, in communication with the first primary multiplier output, configured to subtract the values provided by the first primary multiplier, and having a first subtractor output;
a first secondary multiplier, in communication with the first subtractor output and the phase accumulator, configured to multiply the value provided by the first subtractor and the phase input, and having a first secondary multiplier output; and
a first primary adder, in communication with the first primary multiplier output, one of the first point outputs, and the first secondary multiplier output, configured to add the values provided by each output.

8. The frequency generator of claim 7, wherein the converter circuit is configured to provide a sin portion and a cos portion of the sin-cos curve value in series.

9. The frequency generator of claim 7, wherein:
the point selection circuit comprises a plurality of second point outputs; and
the converter circuit further comprises:
a second primary multiplier, in communication with a respective one of the second point outputs and a respective one of the correction outputs, configured to multiply values provided by the second point output and the correction output, and having a second primary multiplier output;
a second subtractor, in communication with the second primary multiplier output, configured to subtract the values provided by the second primary multiplier, and having a second subtractor output;
a second secondary multiplier, in communication with the second subtractor output and the phase accumulator, configured to multiply the value provided by the second subtractor and the phase input, and having a second secondary multiplier output; and
a second primary adder, in communication with the second primary multiplier output, one of the second point outputs, and the second secondary multiplier output, configured to add the values provided by each output.

10. The frequency generator of claim 9, wherein the converter circuit is configured to provide a sin portion and a cos portion of the sin-cos curve value in parallel.

11. The frequency generator of claim 7, wherein the sin-cos converter further comprises:
a delta correction lookup table comprised of a plurality of delta correction values representing a difference between two associated correction values of the correction value lookup table, and having a plurality of delta correction outputs;
a first tertiary multiplier, in communication with a respective one of the first point outputs and a respective one of the delta correction outputs, configured to multiply values provided by the point output and the delta correction output, and having a first tertiary multiplier output;
a first secondary adder, in communication with the first tertiary multiplier output and the first subtractor output, configured to add the values provided by the first tertiary multiplier and the first subtractor, and having a first secondary adder output;
a first quaternary multiplier, in communication with the first secondary adder output and the phase accumulator, configured to multiply the value provided by the first secondary adder and the phase input, and having a first quaternary multiplier output; and
wherein the first primary adder is further in communication with the first quaternary multiplier output.

12. The frequency generator of claim 1, wherein the sin-cos curve value at the phase angle comprises corresponding sin and cos values.

13. The frequency generator of claim 1 integrated into a semiconductor die.

14. The frequency generator of claim 1, further comprising a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the frequency generator is integrated.

15. A frequency generator, comprising:
means for generating a phase signal representing a phase angle; and
means for receiving the phase signal as a phase input;
means for generating a sin-cos curve value as an output, the sin-cos curve value approximately equal to a sin-cos value at the phase angle within a predefined tolerance; and
means for storing a point lookup table comprised of main sin-cos endpoints at predefined intervals in a first angle range, each of the main sin-cos endpoints comprising the sin-cos curve value at a given angle among the predefined intervals;
means for storing a correction lookup table comprised of a plurality of correction values representing a difference between first sub-main sin-cos endpoints at the predefined intervals in a second angle range between two associated main sin-cos endpoints in the point lookup table and approximations of the sin-cos curve values at given angles among the predefined intervals;

means for selecting from the point lookup table a first main sin-cos endpoint associated with a first side of the phase angle and a second main sin-cos endpoint associated with a second side of the phase angle;

means for selecting from the correction lookup table a first correction value correlated with the first main sin-cos endpoint and a second correction value correlated with the second main sin-cos endpoint; and means for generating on an output signal the sin-cos curve value at the phase angle in the means for generating the sin-cos curve value as the output based on the first and second main sin-cos endpoints and the first and second correction values.

16. A method of generating a frequency signal, comprising:

generating a phase signal representing a phase angle through a phase accumulator;

receiving the phase signal as a phase input at a sin-cos converter circuit;

receiving at a converter circuit, from a point lookup table comprising main sin-cos endpoints at predefined intervals in a first angle range, each of the main sin-cos endpoints comprising a sin-cos curve value at a given angle among the predefined intervals, a first main sin-cos endpoint associated with a first side of the phase angle and a second main sin-cos endpoint associated with a second side of the phase angle;

receiving at the sin-cos converter circuit, from a correction lookup table comprising a plurality of correction values representing a difference between first sub-main sin-cos endpoints at the predefined intervals in a second angle range between two associated main sin-cos endpoints in the point lookup table and approximations of the sin-cos curve values at given angles among the predefined intervals, a first correction value correlated with the first main sin-cos endpoint and a second correction value correlated with the second main sin-cos endpoint; and generating the sin-cos curve value as a converter output, the sin-cos curve value is approximately equal to a sin-cos value at the phase angle within a predefined tolerance based on the first and second main sin-cos endpoints and the first and second correction values.

17. The method of claim 16, wherein each of the plurality of correction values comprise at least one of a secant-based coefficient for a Buneman identity.

18. The method of claim 17, wherein the coefficients approximately mirror each other from opposing ends around a central value, allowing for use of a single data set to represent all of the coefficients.

19. The method of claim 16, wherein the approximations of the sin-cos curve values at the given angles among the predefined intervals comprise linear interpolations resulting in second sub-main sin-cos endpoints.

20. The method of claim 16, wherein the first angle range, in which the main sin-cos endpoints are at the predefined intervals, spans n/4 radians of a unit circle.

21. The method of claim 20, wherein the phase input further signifies a section of the unit circle correlating to the phase angle, and further comprising:

selecting the main sin-cos endpoints correlating to a reference phase angle representative of an equivalent phase angle within the first angle range by a selector of a point selection circuit;

switching the main sin-cos endpoint values correlating to the phase angle when necessary by a switch of the point selection circuit; and negating the main sin-cos endpoint values correlating to the phase angle when necessary by a negator of the point selection circuit.

22. The method of claim 16, further comprising:

receiving at the converter circuit, from the point lookup table, a plurality of first main sin-cos endpoint values;

receiving at the converter circuit, from the correction lookup table, the plurality of correction values;

multiplying a respective one of the first main sin-cos endpoint values and a respective one of the correction values by a first primary multiplier;

subtracting resultants of the multiplying by the first primary multiplier by a first subtractor;

multiplying a resultant of the subtracting by the first subtractor and the phase input by a first secondary multiplier; and adding the respective one of the first main sin-cos endpoint values, the resultants of the multiplying by the first primary multiplier, and the resultant of the multiplying by the first secondary multiplier by a first primary adder.

23. The method of claim 22, further comprising providing a sin portion and a cos portion of the sin-cos curve value in series by the converter circuit.

24. The method of claim 22, further comprising:

receiving at the converter circuit, from the point lookup table, a plurality of second main sin-cos endpoint values;

multiplying a respective one of the second main sin-cos endpoint values and a respective one of the correction values by a second primary multiplier;

subtracting resultants of the multiplying by the second primary multiplier by a second subtractor;

multiplying a resultant of the subtracting by the second subtractor and the phase input by a second secondary multiplier; and adding the respective one of the second main sin-cos endpoint values, the resultants of the multiplying by the second primary multiplier, and the resultant of the multiplying by the second secondary multiplier by a second primary adder.

25. The method of claim 24, further comprising providing a sin portion and a cos portion of the sin-cos curve value in parallel.

26. The method of claim 22, further comprising:

providing a delta correction lookup table comprised of a plurality of delta correction values representing a difference between two associated correction values of the delta correction lookup table, and having a plurality of delta correction outputs;

multiplying a respective one of the first main sin-cos endpoint values and a respective one of the delta correction values by a first tertiary multiplier;

adding resultants of the multiplying by the first tertiary multiplier and the resultant of the subtracting by the first subtractor by a first secondary adder;

multiplying the resultant of the first secondary adder and the phase input by a first quaternary multiplier; and adding the resultant of the first quaternary multiplier by the first primary adder.

27. A non-transitory computer-readable medium having stored thereon computer-executable instructions to cause a frequency generator to:
generate a phase signal representing a phase angle;
receive the phase signal as a phase input;
receive from a point lookup table comprising main sin-cos endpoints at predefined intervals in a first angle range, each of the main sin-cos endpoints comprising a sin-cos curve value at a given angle among the predefined intervals, a first main sin-cos endpoint associated with a first side of the phase angle and a second main sin-cos endpoint associated with a second side of the phase angle;
receive from a correction lookup table comprising correction values representing a difference between first sub-main sin-cos endpoints at the predefined intervals in a second angle range between two associated main sin-cos endpoints in the point lookup table and approximations of the sin-cos curve values at given angles among the predefined intervals, a first correction value correlated with the first main sin-cos endpoint and a second correction value correlated with the second main sin-cos endpoint; and
generate the sin-cos curve value as a converter output, the sin-cos curve value approximately equal to a sin-cos value at the phase angle within a predefined tolerance in a converter output signal based on the first and second main sin-cos endpoints and the first and second correction values.

* * * * *